Aug. 28, 1928.　　　　　　　　　　　　　　　　1,682,576
W. E. LEWIS
FLEXIBLE SHAFT COUPLING
Filed March 15, 1927
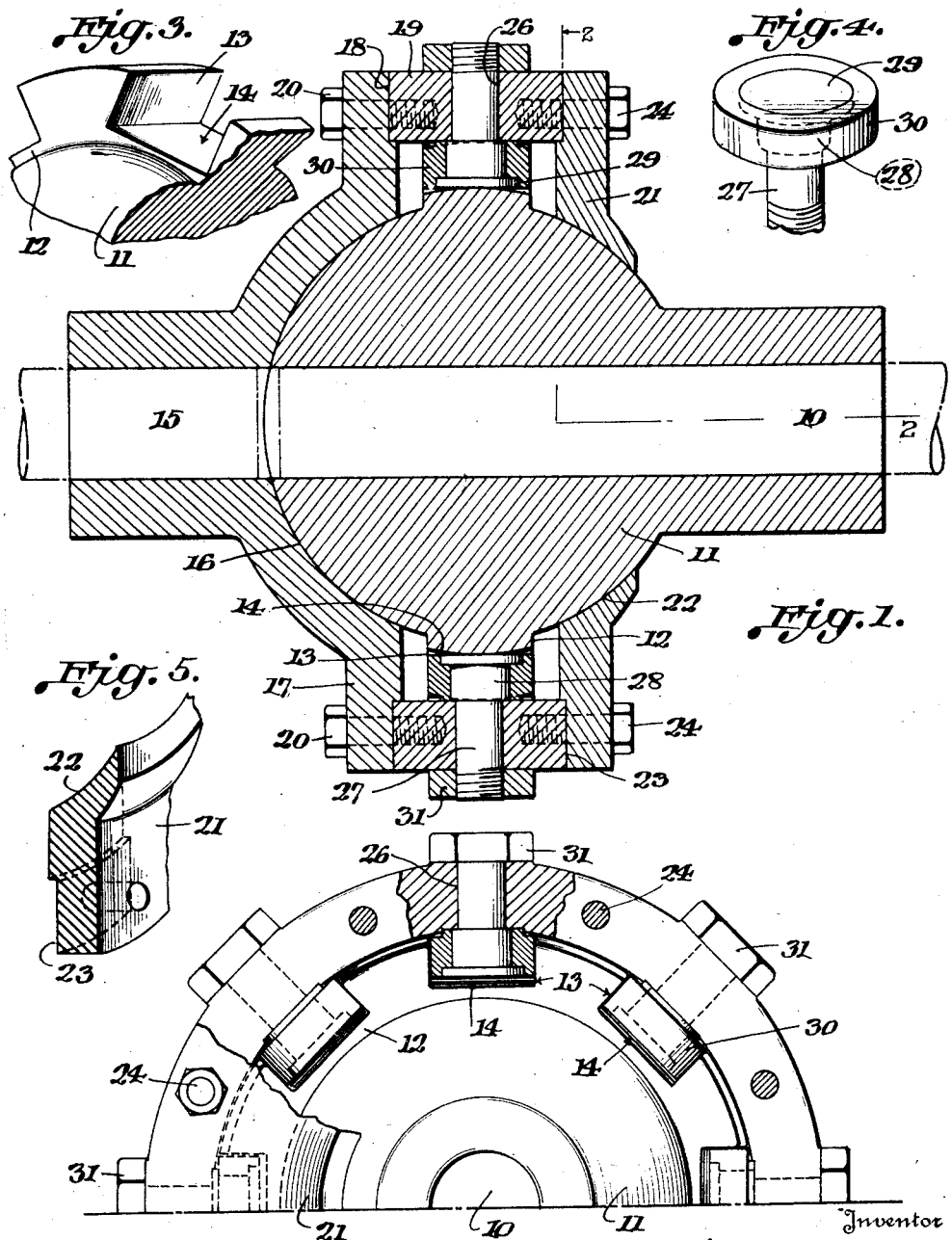
Inventor
William E. Lewis
By David Pelton Moore
Attorney Patented Aug. 28, 1928.

1,682,576

UNITED STATES PATENT OFFICE.

WILLIAM E. LEWIS, OF WEST MYSTIC, CONNECTICUT.

FLEXIBLE SHAFT COUPLING.

Application filed March 15, 1927. Serial No. 175,579.

This invention relates to improvements in flexible shaft couplings, one object of the invention being the provision of a universal joint wherein provision is made for the necessary flexing movement due to inequalities in the alignment of the shaft while no radial movement independent of the two co-operating members is permitted, thus providing a coupling especially adapted for use in propeller shafts and the like.

A further object of this invention is the provision of a coupling of this type, which is simple, durable and inexpensive in construction, and thoroughly efficient and practical in use.

In the accompanying drawings:—

Figure 1 is a longitudinal sectional view through the completed coupling.

Figure 2 is a section on line 2—2 of Figure 1.

Figures 3, 4 and 5 are detail views of various elements of the coupling.

Referring to the drawings, the numeral 10 designates the drive shaft or a member to fit thereon and be made fast thereto, and which is provided with the ball head 11, provided with the circumferential rib or annular projection 12. This rib or projection is provided with a plurality of recesses or notches 13, the inner face 14 of each of which is convexed on a circle the center of which is the center of the ball head, and the purpose of which will presently appear.

The driven shaft 15 or the member to be made fast to the driven shaft is provided with a cupped end 16, against which and in which fits for oscillation the ball head of the drive member. This end 16 is provided with the flange or rim 17, provided with the external circular recess 18 in which is seated one end of the ring or annulus 19, which is in turn made fast to the flange by a plurality of bolts 20.

The flange 21, is provided with a concaved rim 22, which fits upon the ball head 11, and with the portion 16 forms a socket for the ball head. The flange 21 is provided with the circular recess 23 to receive the other edge of the ring or annulus 19, and a plurality of bolts 24 secure the flange 21 to the ring 19.

Thus far it is evident that a ball-and-socket joint is provided and one which will permit the necessary flexing of the joint, but in order to make a desirable driving connection between the same, the ring or annulus 19 is provided with a plurality of radial openings 26, each one of which has fitted therein the bolt 27, having the enlarged smooth portion 28 and head 29, so that the block or roller 30 may be held thereon, a nut 31 holding the bolt and block in place. These blocks or rollers, 30 fit within the respective recesses 13 of the rib 12 and act as a connecting medium between the head 11 and the driven member so that rotary motion may be imparted thereto, and yet the necessary flexing permitted.

By this arrangement a powerful oil-tight flexible coupling is provided, and one that is particularly designed for use upon installations in marine propeller line shaftings. This coupling is also designed to take care of any end thrust due to the propeller and without such thrust coming on the driving units comprising the blocks or rollers 30 and the bolts 27.

What I claim, as new, is:—

A ball-and-socket universal joint, including a ball provided with a circumferential rib transversely of the joint, said rib being provided with recesses which with the rib forms external drive teeth, a ring of greater diameter than the rib and of greater width than the rib surrounding the ball adjacent the rib, two detachable socket forming members attached one on each side of the ring and forming therewith the socket for encasing the ball, and a plurality of pins carried by the ring and projecting to fit within the respective recesses of the rib, whereby radial movement is transmitted from one member of the joint to the other.

In testimony whereof I affix my signature.

WILLIAM E. LEWIS.